March 18, 1958 W. M. PATTERSON 2,827,071
LIQUID SEAL BREATHER VALVE VENT
Filed Sept. 30, 1954
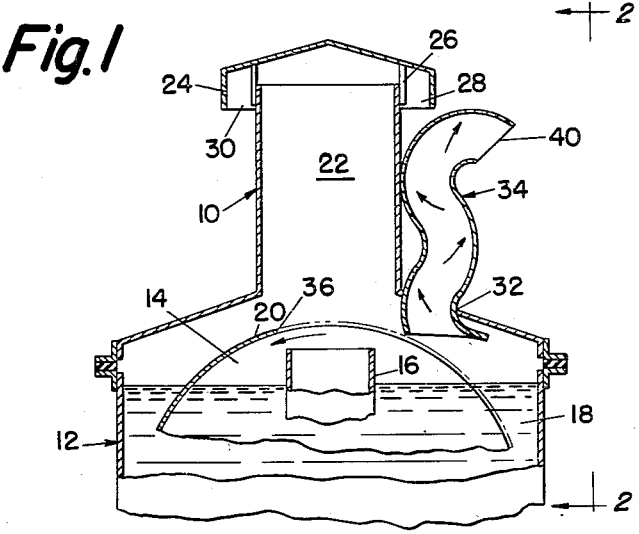
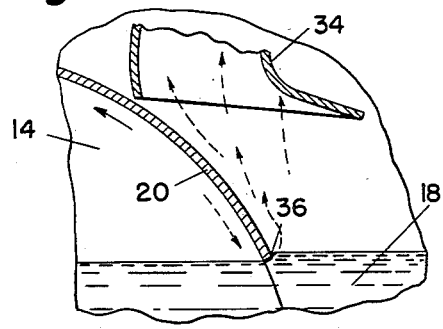
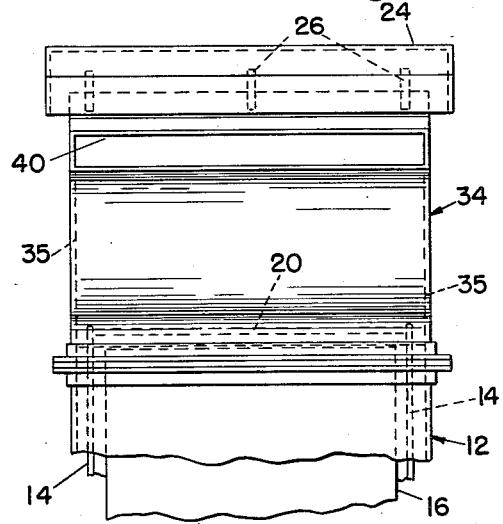
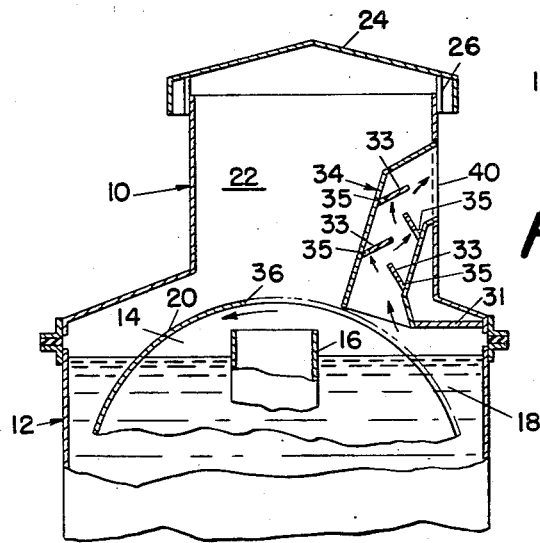
*INVENTOR.*
WALLACE M. PATTERSON
BY Robert O. Spindle
ATTORNEY United States Patent Office 2,827,071
Patented Mar. 18, 1958

2,827,071

LIQUID SEAL BREATHER VALVE VENT

Wallace M. Patterson, Penn Wynne, Pa., assignor to Sellers Injector Corporation, Philadelphia, Pa., a corporation of Pennsylvania Application September 30, 1954, Serial No. 459,494

5 Claims. (Cl. 137—254)

This invention relates, in general, to pressure relief mechanisms, and particularly to hoods or relief passageways for pressure venting valve mechanisms of the liquid-sealed type used as storage tank breathing devices.

One of the most successful forms of tank breathing valves is the liquid sealed type which is generally illustrated by the mechanism described and claimed in my application Serial No. 259,769, filed December 4, 1951, now Patent No. 2,715,909, dated August 23, 1955. A rotatable valve member, normally in sealing contact with a liquid body, is pressure operated to relieve either pressure or vacuum conditions arising in the storage vessel to which it is attached. Conservation of the liquid seal body during pressure venting conditions where the escaping pressured gases pass through or over the surface of the liquid seal presents both maintenance and operating problems. Proper operation requires a sealing liquid depth within predetermined limits, which must be maintained. It is, therefore, a primary object of this invention to provide means for eliminating or greatly reducing the loss of sealing liquid which becomes entrained in the exiting gases during pressure relief operations.

It will be evident that the entrained liquid particles in the exhausting pressure gases could be recovered by interfering with the gas passage. Because of operating characteristics of the revolving liquid sealed valve, such interference would prevent proper pressure relief, making the valve a hazard rather than a conservation-relief asset. A further object of this invention is to provide means for recovering the entrained liquid particles from the exiting gases through the valve without interfering with the free passage of the gases, thus permitting unimpeded valve efficiency.

Although the subject-matter of this application is directed mainly to handling pressure gases passing through liquid sealed, rotatable valves of the class noted, it will be further recognized that this same valve must operate satisfactorily for relieving vacuum conditions. Under such requirement the unobstructed passage of relieving gas is further emphasized. Although the movement of relieving gas is reversed to the direction of escaping pressure gas through the valve, any undue interference with the pressure and movement of the vacuum relieving gas would prevent proper valve operation. Consequently, still another object of this invention is to provide means for recovering entrained particles of sealing liquid from escaping pressure gases, preserving, however, the vacuum relieving efficiency of such valve.

With the above and other objects in view, all of which will be further disclosed in the course of the following description, the invention consists of two separated outlets, one which the first rush of relieving gases enters preferentially because of its construction and position, baffled or tortuous to entrap and return entrained droplets to the main body of sealing fluid, the other as direct an outlet to the atmosphere as practicable with other considerations, and containing no structure for moisture entrapment, which the gases enter preferentially once the rotatable valve member is free of sealing liquid. By position, and design, the baffled or tortuous passageway receives the initially vented pressure gases and entrained particles of sealing liquid from the valve body, captures the liquid and returns it to the main tank while transmitting the initially vented gases to the atmosphere.

In the accompanying drawings the selected forms of apparatus accomplishing the objects of this invention are illustrated by various figures in which the parts are similarly designated.

Figure 1 is an elevational view in section of the device in operating position.

Figure 2 is an elevational view taken on lines 2—2 of Figure 1.

Figure 3 is an elevational view, in section, of an alternate structure to show further application of the invention.

Figure 4 is an enlarged view of a portion of the device to assist in describing its operation.

Valves of this general class, where there is conflict in operating characteristics caused by dual requirements of vacuum and pressure conditions, are generally overdesigned in favor of better operation for pressure relief. This is accepted as good practice due to the greater volume requirement in the relief of pressure conditions over vacuum conditions, and to the greater urgency of pressure relief because of higher intensity. There is a limitation of the extent to which the pressure relieving condition can be favored, however, as it is a necessary requirement that the vacuum condition be fully met, as well, to avoid tank collapse. Further, the relieving gas in vacuum operation, normally atmosphere, in addition to supplying the necessary pressure balance, forms a protective blanket over the volatiles, and in subsequent pressure operations forms the bulk of the relieved material, further conserving the volatile constituents. Hence the valve mechanism and the vent passage modification particularly described here is designed for pressure relief as a controlled safety maneuver, and is also constructed to admit the required volumes of vacuum relieving gases without undue obstruction, as a balanced requirement. It will be evident that the hood modification of this invention aids and abets these operations.

It will be immediately evident to those versed in the art that a typical nozzle constructed as indicated by well known mathematical formula would solve the problem of uninterrupted passage of relieving gases to and from the valve with minimum turbulence and resulting obstruction to valve capacity and possibly recover entrained liquid if the passage were long enough. Further, such a structure, of necessity very long in longitudinal dimension, would bar small animals and could be shielded to keep out bugs. Such a solution would, however, extend the physical height of such a relief valve beyond all practical limits and subject the device to wind stresses which would overcome its otherwise practical construction. Therefore it is desirable to try to capture the principles of the nozzle for efficient passage of the relieving gases, in two directions in this case, and also keep the dimensions within practical limits, in addition to recovering entrained liquid particles.

In my application Serial No. 437,927, filed June 21, 1954, one solution for these problems is suggested. A plurality of vanes forming numerous expanding nozzle-shaped volumes is described as a pressure control feature, and a baffle for impingement of liquid particles is added. This solution obtains desired valve operating characteristics within practical physical limitations but adds considerable to cost and effort of manufacture.

The modification of hood or other relieving passageway disclosed here, however, can be applied to less efficient venting means further simplified for manufacturing and maintenance or changed for other specific ends. A minimum of two passages is required, one the entrained liquid recapturing element as an initial intercepting surface, and the other the main venting passageway having its relieving characteristics unimpaired by liquid removal means, both positioned relative to each other and the valve member, for proper performance.

Referring to the four figures of the drawing, the separate passageway of this invention designed and positioned to recover entrained droplets of sealing liquid is shown in two basic forms. Further, these forms are combined with venting passageways, symbolically indicated as hoods of rudimentary design, and are added as in Figures 1 and 2, or incorporated as a part of this elementary hood, as in Figure 3.

In Figure 1, this conventional type of hood 10 adopted here is shown as forming a part of valve body 12 housing a pivotally-mounted, liquid-sealed valve member 14 of the general class described in my currently pending application Serial Number 259,769, filed December 4, 1951, previously noted. A venting conduit 16 connected to a source of pressure, in this instance a storage tank in which pressure or vacuum conditions can exist, extends upwardly through the body of sealing liquid 18 to vent above its surface and under the peripheral plate 20 when the valve is in the closed or sealing position.

The venting passage 22 of the hood 10 may be of indefinite length and shape, conected to a recovery system, or other modifications, as will be well understood by those versed in the art, or vent to atmosphere as indicated here. In Figure 1, therefore, the passage 22 is capped with a roof member 24 supported by brackets 26 to preserve openings 28 and 30 for pressure relief. A divided slope is constructed into the roof member 24 to drain away rain and snow as well as assist in keeping out bugs, birds and small animals from the valve chamber 12.

Placed adjacent the passageway 22, exterior thereof, and let into the valve chamber through a sealing aperture 32, the entrained liquid recovering element 34 of this invention is positioned. In this view, Figure 1, a duct, rectangular in cross-section as seen by reference to Figure 2, is fashioned to present a tortuous or serpentine path to escaping vapors.

Reference to these two figures will clarify the construction of the serpentine flue of rectangular cross-section, and show it in operating position. The direction of opening in response to pressure and vacuum relief for the pivoted, movable valve member is shown by the arrows on Figures 1, 3 and 4. A trailing edge 36 of the peripheral plate 20 is shown in its fully open position (Figs. 1 and 3) uncovering the venting conduit 16. In phantom line, this plate is extended around the valve to show its normal operating sealed relation to the liquid recovery flue 34 and to give a basis for discussion of the operation later in detailing Figure 4.

In Figure 1, the flue 34 is shown positioned relative to the valve member 14, and particularly with regard to its initial opening position. The flue is shaped relative to the valve peripheral plate 20 and the trailing edge 36, to present a receptive opening to escaping pressure gases, with the closest point of contact at the locus of last liquid particle entrainment. By shaping the flue 34 as shown the initial liquid-particle laden vent gas is interrupted during the required phase, and the effect of the flue terminated when no longer needed for liquid recapture. It will be noted that the clearance between the valve member 14 and the closest point of the receiving end of the flue 34 is just sufficient to prevent gum or ice from locking them together, thereby preventing operation of the valve member. Figure 2 shows the flue 34 extending transversely across the full extent of valve member 20 embracing the valve member within the limits of the flue end walls 35. From this position the serpentine travel of the recovery flue is upward through a number of deflecting curves until it opens as at 40 with a downwardly deflected aperture to vent without accepting rain and snow.

An alternate form of the device, emphasizing the principal features of the invention, namely a separate entrained liquid recovery duct or flue having an interrupted passage to remove liquid droplets and positioned for maximum operation efficiency with a liquid sealed rotary valve member, is shown in Figure 3. Here a flue of angular arrangement and baffled pathway braced as by bracket 31 within and forming a part of the symbolical hood 10 is shown. The flue 34 forms a part of the hood passageway 22 finding an outlet in the wall thereof as at 40. Baffles 33 serve the same purpose as the serpentine curves discussed above, namely of deflecting the liquid laden gases, causing the liquid to be abandoned and drained back into the body of the sealing liquid. The baffles 33 can be slotted or apertured at their juncture with the walls of the flue as at 35, permitting immediate drainage. Thus repeated pressure operations will be successively completed and liquid will not be held for later driving from the flue in advancing elevations. Also, this flue is arranged adjacent the valve member at the point of opening as was noted above in reference to Figure 1 to catch the initial pressure gases heavily laden with the sealing liquid. After rotation through a predetermined arc the flue 34 is terminated and the gases free of sealing liquid droplets, are free to vent through passageway 22 without needless obstruction.

These operating features will be better understood by referring to Figure 4 where an enlarged view of the locus of the valve member 14 and the liquid-recovery flue 34 is shown. In this view the trailing edge 36 of the peripheral plate 20 of valve member 14 is shown breaking the pressurized surface of the sealing liquid 18. The direction of valve member movement is shown by the arrow in full line. The dotted arrow shows the direction of movement of the pressure gases in the escape from vent conduit 16 under the valve member and through and above the sealing liquid surface.

As noted in the application of reference dealing with these valves, the valve member response is controlled by elements other than the valve. The valve responds to the actuation of these elements and not to pressure under its peripheral covering plate. Consequently considerable pressure can be accumulated under the inverted valve member preliminary to the revolving action of the member to release it. The result is a difference in level of the sealing liquid within and without the confines of the valve member. This is illustrated in Figure 4 where the pressure condition depresses the liquid under the valve member and raises it externally thereof.

Consequent movement of the valve member 14 as it revolves into relieving position directs the pressure gases against the liquid under the trailing edge 36 of the peripheral plate 20. Agitation of the liquid as the pressure is balanced, the surface broken, and the action of the escaping gas being first blown through and then deflected against the surface, entrains the liquid droplets which must be replaced if not recovered.

This initial entrainment lasts only as long as these conditions exist wherein the sealing liquid takes such an active part in the relieving operation. Once the venting gas is free to move directly into the comparatively unobstructed passageway 22 and the droplets are removed or drip from the trailing edge of the valve member, liquid recovery flue 34 serves no further purpose. Whereas initially it must receive and transmit the full pressure relief effect and remove the entrained liquid, once past that seal-breaking movement, this flue is no longer required and maximum venting freedom is desirable. By being shaped and positioned as shown the entrained liquid recovery feature is removed from operation at the required point, and unrestrictive venting takes over the operation.

In contrast with this pressure relief condition, discussed in detail above, where the pressure of the storage vessel exceeds atmospheric pressure causing a venting action, the reverse condition arises where a vacuum condition must be relieved. There is no requirement for the recapture of entrained sealing liquid particles as the opening pressure differentials are low and the velocity of the relieving atmosphere moving from outside the hood into the storage vessel is too low for objectionable liquid entrainment. However, a full relieving volume of vacuum breaking gas is required immediately at the locus of the sealing liquid and the rotating valve member. Auxiliary flue 34 augments this atmospheric relieving action in the case of vacuum relief by directing initially needed gas to the point of the valve seal break. Consequently, the vacuum relief action is one of controlled and directed relief gas movement started by the valve operation and conducted to the valve locus by the hood passageways. As noted this action is the least demanding of the two conditions requiring relief. It is provided for, however, and considered here as a controlling factor in the design of such protective coverings.

A preferred form of the device illustrating the application of the disclosed venting principles is shown. Modifications of size, shape, relative proximity with other elements, and like changes, will be immediately evident. It is the intention of the inventor that such changes and substitutions be covered by the scope of the spirit of this invention being limited only by the claims appended to and forming a part of this application.

What is claimed is:

1. A venting passageway for liquid sealed pressure relief valves comprising a first flue positioned to receive the initial stream of pressure gas with entrained liquid-seal particles, said flue adapted to interrupt the liquid particles and return them for subsequent operation, and a second unobstructed passageway adjacent and operatively following said first flue for subsequent relief of liquid-particle free pressure gases.

2. The venting passageway of claim 1 further characterized by said first flue being fashioned to present a tortuous path to the liquid-particle suspending gases.

3. The venting passageway of claim 1 further characterized by said first flue being baffled to present a plurality of re-directing surfaces causing liquid particles suspended by the escaping gases to be deposited thereon.

4. A hood to conduct pressure relieving gases from oscillating liquid sealed pressure valves comprising two independent passageways, the first positioned to receive venting gases from the valve at the locus of pressure relief and extended to receive said gas over an operating distance of the valve member wherein substantially all appended sealing liquid is removed, and baffle means in said first flue to remove entrained liquid particles during relief movement of the vented gases; and a second passageway proximate the first passageway operatively positioned to receive the substantially liquid free vented gases in successive operation, said second passageway designed to freely vent pressure gases without obstruction.

5. In a liquid-sealed rotatable vent valve for relieving pressure conditions in petroleum storage vessels wherein the valve member is rotated from engagement with the liquid seal for venting purposes and the pressure gases escape through a flue in a hood mounted above said valve member, the improvement in said valve comprising an auxiliary flue positioned adjacent the flue through said hood to receive the initial stream of pressure gases supporting entrained liquid-seal particles, said auxiliary flue being fashioned to present a tortuous path to the liquid-particle suspending gases causing the deposit of the suspended liquid in said auxiliary flue.

References Cited in the file of this patent

UNITED STATES PATENTS

| | | |
|---|---|---|
| 2,247,566 | Walton | July 1, 1941 |
| 2,252,174 | Glab | Aug. 12, 1941 |
| 2,591,098 | Quist | Apr. 1, 1952 |
| 2,680,450 | Quist | June 8, 1954 |